(12) United States Patent
De Bruin et al.

(10) Patent No.: US 11,034,123 B2
(45) Date of Patent: Jun. 15, 2021

(54) LIGHTWEIGHT HERMETIC STORAGE SYSTEMS AND METHODS FOR DRY AGRICULTURAL COMMODITIES

(71) Applicant: GRAINPRO, INC., Concord, MA (US)

(72) Inventors: Tom De Bruin, Olongapo (PH); Philippe Villers, Concord, MA (US)

(73) Assignee: GRAINPRO INC., Concord, MA (US)

( * ) Notice: Subject to any disclaimer, the term of this patent is extended or adjusted under 35 U.S.C. 154(b) by 256 days.

(21) Appl. No.: 16/153,776

(22) Filed: Oct. 7, 2018

(65) Prior Publication Data
US 2020/0108580 A1   Apr. 9, 2020

(51) Int. Cl.
| | |
|---|---|
| B32B 1/00 | (2006.01) |
| B32B 27/08 | (2006.01) |
| B32B 27/30 | (2006.01) |
| B32B 27/32 | (2006.01) |
| B32B 27/34 | (2006.01) |
| B65D 88/16 | (2006.01) |
| B65D 90/02 | (2019.01) |

(52) U.S. Cl.
CPC .................. *B32B 1/00* (2013.01); *B32B 27/08* (2013.01); *B32B 27/306* (2013.01); *B32B 27/32* (2013.01); *B32B 27/34* (2013.01); *B65D 88/1606* (2013.01); *B65D 90/022* (2013.01); *B32B 2250/24* (2013.01); *B32B 2307/402* (2013.01); *B32B 2307/41* (2013.01); *B32B 2307/54* (2013.01); *B32B 2307/554* (2013.01); *B32B 2307/71* (2013.01); *B32B 2307/712* (2013.01); *B32B 2307/714* (2013.01); *B32B 2307/764* (2013.01); *B32B 2439/40* (2013.01); *B32B 2439/70* (2013.01)

(58) Field of Classification Search
CPC ......... B65D 81/24; B32B 27/08; B32B 27/16; B32B 27/32; B32B 27/34
USPC ............ 53/449; 220/626; 383/109; 428/35.7
See application file for complete search history.

(56) References Cited

U.S. PATENT DOCUMENTS

| | | | | |
|---|---|---|---|---|
| 4,708,896 | A * | 11/1987 | Akao ..................... | B65D 81/30 428/34.3 |
| 4,856,650 | A * | 8/1989 | Inoue .................... | A23L 3/3436 206/204 |
| 4,947,525 | A * | 8/1990 | Van Erden ......... | B65D 33/2516 156/66 |
| 5,911,665 | A * | 6/1999 | Heydarpour ............ | B32B 27/08 53/449 |
| 8,528,305 | B2 * | 9/2013 | Villers ................... | A01N 25/34 53/449 |
| 9,017,799 | B2 * | 4/2015 | Chu ....................... | B32B 27/08 428/178 |

(Continued)

*Primary Examiner* — Thanh K Truong
*Assistant Examiner* — Patrick B Fry
(74) *Attorney, Agent, or Firm* — Daniel J. Swirsky; Ricki L. Simon; AlphaPatent Associates Ltd.

(57) ABSTRACT

A lower cost, light weight, hermetic system and method for storage of dry commodities outdoors for up to 1000 tonnes of commodity includes a multilayer joined material with a thickness of 0.2-0.3 mm, a weight of approximately 200 $g/m^2$, a permeability to oxygen of less than 3 $cc/m^2/day$ and a permeability to water of less than 4 $g/m^2/day$, a tensile strength of approximately 38 MPa, and insect penetration-resistance of approximately 1200 $g/m^2$ (Dart test value).

25 Claims, 3 Drawing Sheets

(56) References Cited

U.S. PATENT DOCUMENTS

2018/0002085 A1* 1/2018 Raghu .................. B65D 65/466
2019/0091976 A1* 3/2019 Roehrig ................. B32B 27/10

* cited by examiner

LIGHTWEIGHT HERMETIC STORAGE SYSTEMS AND METHODS FOR DRY AGRICULTURAL COMMODITIES

FIELD

The invention is directed to an outdoor lightweight hermetic storage system for dry agricultural commodities, which has improved permeability, is lighter weight, and has greater tensile strength and insect penetration resistance as compared to earlier, multi-tonne capacity, hermetic storage systems.

BACKGROUND

Hermetic products for storage of dry agricultural commodities exist that satisfy a variety of uses. Various GrainPro® systems exist that have specifications that are effective for their intended uses, such as, the GrainPro® Cocoon™, the GrainPro® Self-Verifying Cocoon™, the GrainPro® Self-Verifying Mega Cocoon™, the GrainPro® TranSafeliner™, the GrainPro GrainSafe™ and the GrainPro® SuperGrainbag™.

Although effective for their intended uses, there remains an unmet need for improved systems for outdoor storage of these dry agricultural commodities that can accommodate large volume storage quantities that are economical, lightweight, self-supporting, reliable in outdoor storage conditions and have effective permeability characteristics for long-term storage of the dry agricultural commodities.

SUMMARY

There is provided, in accordance with embodiments of the invention, a system for hermetic storage of a dry commodity having a weight of between 1 tonne and 1000 tonnes. The system includes a flexible, hermetic storage container for containment and hermetic sealing of the dry commodity therein. The flexible, hermetic storage container includes a wall having a thickness of 0.1-0.5 mm, a tensile strength of 25-45 MPa, and insect penetration resistance of 1000-1200 $g/m^2$. The wall includes an outer layer comprised of a first plastic material and an inner layer comprised of a second plastic material which might be different than the first plastic material. The outer layer and inner layer plus intermediate layers are joined together forming a multilayer material, wherein the storage container has a total thickness of 0.1 to 0.5 mm, a weight of less than 300 $g/m^2$, a permeability of less than 3 $cc/m^2/day$ for oxygen and less than 4 $gm/m^2/day$ for water. The system further includes a hermetic sealing mechanism for sealing the flexible, hermetic storage container.

In accordance with further features in embodiments of the invention, at least one of the outer layers and the inner layer is a polyethylene material. In some embodiments, at least one of the layers is a polyamide material or EVOH or a combination thereof. The system may include up to five layers and in some embodiments, up to seven layers or more. In embodiments of the invention, the outer layer is white in color to block UV radiation and to lower temperature. In some embodiments of the invention, at least one of the layers is black in color, and may be comprised of, for example, a carbon black concentrate, to increase opacity to photosynthetically active radiation (PAR) light. In embodiments of the invention, 70-90% of the multilayer material is comprised of polyethylene, and in some embodiments, 85% of multilayer material is comprised of polyethylene. The polyethylene may include multiple types of polyethylene, wherein each of the multiple types of polyethylene comprises one of the layers of the multilayer material. The storage container has a weight of less than 300 $g/m^2$ and in some embodiments, less than 200 $g/m^2$. In yet additional embodiments, at least one of the layers is a bulk layer having a thickness that is two or more times thicker than the thickness of the other layers.

There is provided, in accordance with embodiments of the invention, a method for hermetic storage of a dry commodity having a weight of between 1 tonne and 1000 tonnes. The method includes providing a flexible, hermetic storage container for containment and hermetic sealing of the dry agricultural commodity therein. The storage container includes an outer layer comprised of a first plastic material and an inner layer comprised of a second plastic material which could be different than the first plastic material, wherein the outer and inner layers and intermediate layers are joined to provide a multilayer material. The method further includes providing the storage container in a size to hold the commodity having a weight of 1-1000 tonnes, providing the multilayer material with a thickness of 0.1 to 0.5 mm, typically, a tensile strength of 25-45 MPa, and insect penetration resistance of 1000-1500 $g/m^2$. In some embodiments, the method further includes providing the storage container having a weight of less than 300 $g/m^2$, a permeability of less than 3 $cc/m^2/day$ for oxygen and less than 4 $g/m^2/day$ for water, placing the dry agricultural commodity, having a weight of 1-1000 tonnes, in the flexible, hermetic storage container, and hermetically sealing the flexible, hermetic storage container.

In accordance with further features in embodiments of the invention, the method further includes providing resistance to insect action by providing high puncture resistance, elasticity and crack propagation resistance, and providing resistance to UV and PAR. In accordance with further features in embodiments of the invention, the hermetic sealing is done by zipping a hermetic zipper. In accordance with further features, providing includes providing at least one layer of a polyamide or EVOH material or a combination thereof and at least one layer of a polyethylene material. In accordance with further features, providing includes at least one additional layer, wherein the first, second and at least one additional layers are joined to form the multilayer material. More layers of up to five or up to seven or eight or ten may be joined to form the multilayer material. In accordance with further features in embodiments of the invention, the providing includes providing one or multiple types of polyethylene such that 70-90% of the multilayer material is comprised of polyethylene. In accordance with further features in embodiments of the invention, the providing includes providing the multilayer material with a weight of less than 300 $g/m^2$ and in some embodiments less than 200 $g/m^2$.

Unless otherwise defined, all technical and scientific terms used herein have the same meaning as commonly understood by one of ordinary skill in the art to which this invention belongs. Although methods and materials similar or equivalent to those described herein can be used in the practice or testing of the invention, suitable methods and materials are described below. In case of conflict, the patent specification, including definitions, will control. In addition, the materials, methods, and examples are illustrative only and not intended to be limiting.

BRIEF DESCRIPTION OF THE DRAWINGS

The above and further advantages of the invention may be better understood by referring to the following description in conjunction with the accompanying drawings in which.

Figure 1:
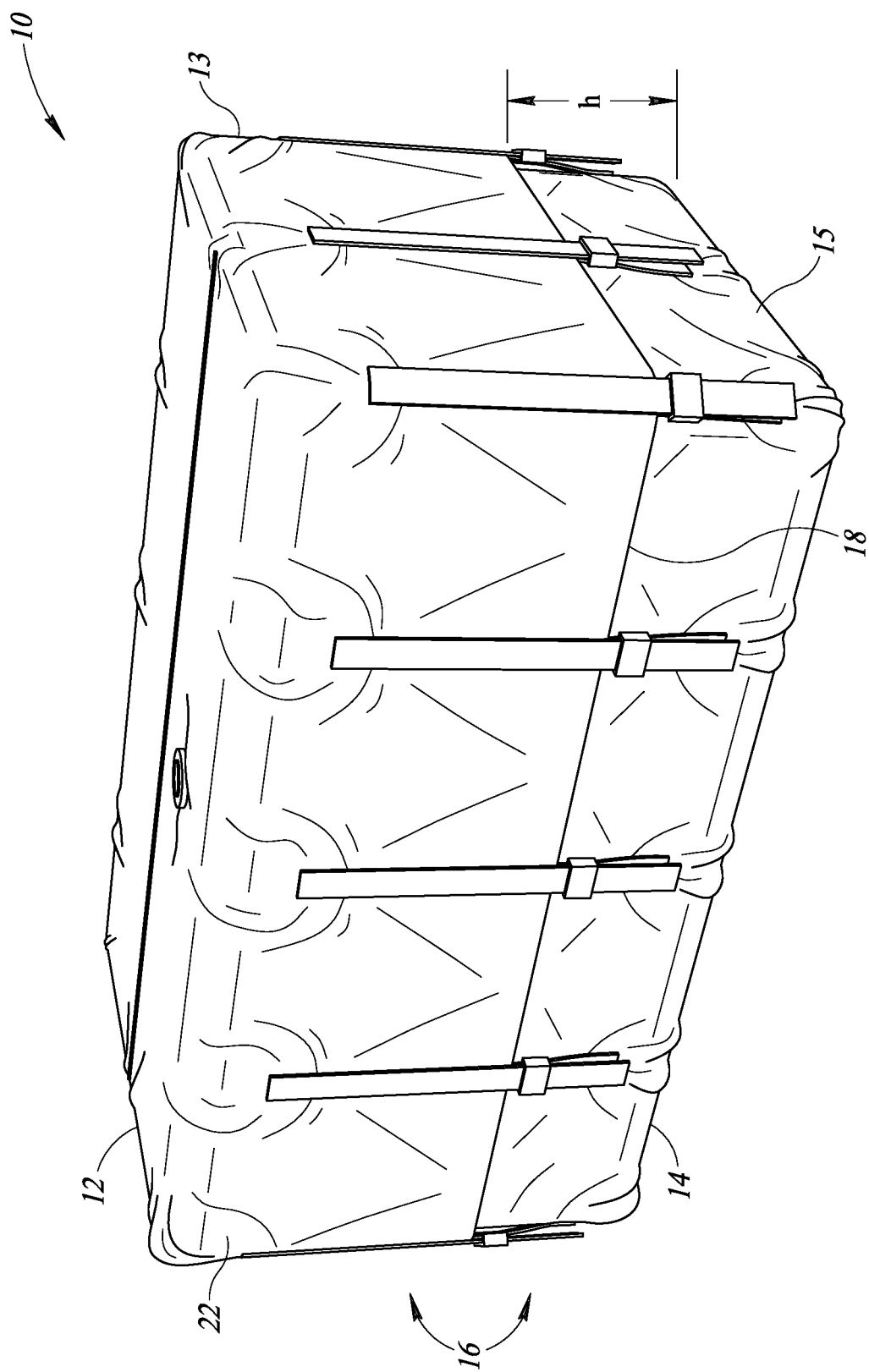
FIG. 1 is a schematic illustration of a storage container for dry commodities, in accordance with embodiments of the invention.

It will be appreciated that for simplicity and clarity of illustration, elements shown in the drawings have not necessarily been drawn accurately or to scale. For example, the dimensions of some of the elements may be exaggerated relative to other elements for clarity or several physical components may be included in one functional block or element. Further, where considered appropriate, reference numerals may be repeated among the drawings to indicate corresponding or analogous elements. Moreover, some of the blocks depicted in the drawings may be combined into a single function.

DETAILED DESCRIPTION

In the following detailed description, numerous specific details are set forth in order to provide a thorough understanding of the invention. It will be understood by those of ordinary skill in the art that embodiments of the invention may be practiced without these specific details. In other instances, well-known methods, procedures, components and structures may not have been described in detail so as not to obscure the invention.

Hermetic storage systems for long-term storage of dry agricultural products, such as coffee, cocoa, maize and rice, are important for preserving agricultural products and preventing costly spoilage and waste of crops, as well as exponential growth of aflatoxins in storage, a common, public health hazard. Of particular interest are collapsible outdoor storage systems, which are lightweight, non-rigid, air-tight bags that can be folded when not in use. However, when commodities are placed inside the bags, they must have the strength to be freestanding and self-supporting such that they do not need to be supported by a wall or other rigid structure. Such outdoor hermetic storage systems provide greater storage flexibility, as they allow storage and protection of agricultural products in or adjacent to the field, and are less costly storage solutions compared to conventional storage systems.

Outdoor use provides unique challenges for lightweight, hermetic storage systems, as the storage system may be exposed to sun, wind, humidity, precipitation, heat, animals, and insects, among other conditions. Due to extended periods of exposure to sunlight, the storage system must be adequately impermeable to UV radiation, which would otherwise degrade or spoil the stored agricultural products. Additionally, the storage system itself must be made from a material that resists degradation, weakening, or wear from exposure to sunlight to provide a long life. The hermetic storage system must also be impervious to oxygen, water, and water vapor, which could degrade or spoil the stored agricultural product and the storage system itself. In particular, the storage system must provide protection from storms, floods, and other extreme temperature or weather conditions. The storage system must also maintain an internal atmospheric condition that would inhibit fungal growth, and hence, growth of aflatoxins.

Furthermore, the hermetic storage system must have the tensile strength to be free standing and, when loaded, self-supporting and withstand wind, which can induce stress in various directions causing tearing of the storage material. The storage system must be made from a material with adequate tensile strength and elasticity so as to be puncture resistant, particularly against burrowing or biting insects, birds, rodents, or other pests.

In addition to the above properties, to have practical value, the hermetic storage system must have a long useful life and a relatively low cost point, with little to no maintenance and operation costs.

Hermetic storage systems for outdoor use have generally been of two types: large storage systems, and smaller systems. Large storage systems which are self-supporting and can withstand wind and insect penetration are constructed from relatively heavy and thick materials, and are therefore expensive. They are generally comprised of robust materials which provide limited permeability to oxygen and water at a level that while sometimes acceptable, could be improved. Currently available hermetic storage systems provide adequate protection for long-term outdoor storage of agricultural products; however, the cost of the thick heavy materials is high, and therefore translates to a high capital expenditure for the end user.

On the other hand, systems which are constructed from thinner and lighter materials that still provide hermeticity generally lack the tensile strength to resist wind and penetration by insects and other pests, requiring the use of an outer cover for protection when used for outdoor storage. Additionally, the thinner lighter materials do not provide the tensile strength and rigidity to be self-supporting, and must be used inside of a protective outer container, and are therefore limited to use as a liner, for example, in a truck or indoors. Because of the lower tensile strength of the thinner lighter material, the storage system must be made much smaller, and can therefore only store much smaller quantities of products. Additionally, the thinner lighter material does not provide the UV protection necessary for unprotected, outdoor storage, leading to spoilage and degradation of the agricultural product and degradation of the storage system, significantly decreasing the life span of the storage system.

For example, the GrainPro® Self-Verifying Cocoon™ is a system for large volume storage of up to 300 metric tons, and is comprised of flexible polyvinyl chloride (PVC) and is suitable for storage of dry commodities for a year or more. The Self-Verifying Cocoon™ has a life span of approximately 15 years. A variation of the GrainPro® Self-Verifying Cocoon™ is the GrainPro® Self-Verifying Mega Cocoon™, which is a larger version. Although effective, these are constructed from relatively heavy and thick materials, and are therefore more expensive. The GrainPro® TranSafeliner™ is a liner for shipping containers to protect and preserve agricultural commodities while in transit. The GrainPro® TranSafeliner™ is comprised of high strength polyethylene (PE) with a barrier layer, and is 500 times more gas tight than regular plastic. The TranSafeliner™ is effective for its intended use in transit, but are not self-supporting or intended for long term exposure to the elements.

The GrainPro® SuperGrainbag™ is a hermetic bag liner designed for dry commodities that is not self-supporting and is typically used inside a protective outer bag, such as a jute bag. It has a capacity of 15-100 kg, allowing flexibility to store for up to one year and to sell at any time of year. It is comprised of polyethylene (PE) with a barrier layer, with a thickness of 0.078 mm, a weight of 0.07-0.15 kg depending on the size. Thus, the parameters of the GrainPro® SuperGrainbag™ are superior to the other, small size products in terms of the lightweight nature and the decreased permeability to both oxygen and water. However, the material used in this product is not suitable for outdoor use, since it is not resistant to sunlight, not sufficiently strong to be resistant to penetration by birds, some insects and some rodents, and is not resistant to high wind forces. Moreover, the material used in this product is not sufficiently strong for multi-ton loads.

In accordance with the principles of the invention, hermetic storage systems and methods are disclosed that provide solutions for outdoor storage of dry commodities that meet the demanding permeability requirements yet also are self-sustaining, lightweight, cost-effective and can be used outdoors. The systems and methods in accordance with the principles of the invention overcome the problems with large storage systems which can withstand wind and insect penetration, but which are heavy and expensive. Additionally, the systems and methods in accordance with the principles of the invention overcome the problems with hermetic systems that are thin and weak to wind resistance, requiring the use of an outer cover for protection when used for outdoor storage, and are suitable for much smaller quantities of storage than the larger outdoor systems. Identifying these competing needs and innovatively balancing these competing needs, as well as identifying new characteristics that are important, the invention arrives at a new, useful and non-obvious storage solution system and method that is directed to a lightweight cost-effective hermetic storage system for dry agricultural commodities, which has the desired permeability characteristics, tensile strength and insect penetration resistance.

Embodiments of the invention relate to a system and method for storage of dry agricultural commodities between 1 tonne and 1000 tonnes. The term "tonne" may be used interchangeably with metric tons, as is commonly known in the art.

Before explaining at least one embodiment of the invention in detail, it is to be understood that the invention is not limited in its application to the details of construction and the arrangement of the components set forth in the following description or illustrated in the drawings. The invention is capable of other embodiments, other capacities, or of being practiced or carried out in various ways. Also, it is to be understood that the phraseology and terminology employed herein are for the purpose of description and should not be regarded as limiting.

Reference is now made to FIG. 1, which is an illustration of a storage container 10 in accordance with embodiments of the invention. As shown in FIG. 1, storage container 10 includes a top portion 12, a bottom portion 14, walls 16 and a hermetic zipper 18 for hermetically connecting top portion 12 to bottom portion 14, forming a hermetically sealed storage structure. In some embodiments, walls 16 are comprised of a lower section 13 of top portion 12, and hermetic zipper 18 is positioned near the bottom of walls 16. In other embodiments, walls 16 are comprised of an upper section 15 of bottom portion 14, and hermetic zipper 18 is positioned at a top of walls 16. In yet additional embodiments, walls 16 are comprised of a lower section 13 of top portion 12 and an upper section 15 of bottom portion 14, and hermetic zipper 18 is positioned at some point in the middle of walls 16, as shown in FIG. 1. In some embodiments, hermetic zipper 18 is positioned higher than a midpoint of walls 16, such that grains stored within storage container 10 are protected from flooding up to a height h of hermetic zipper 18.

Figure 2:
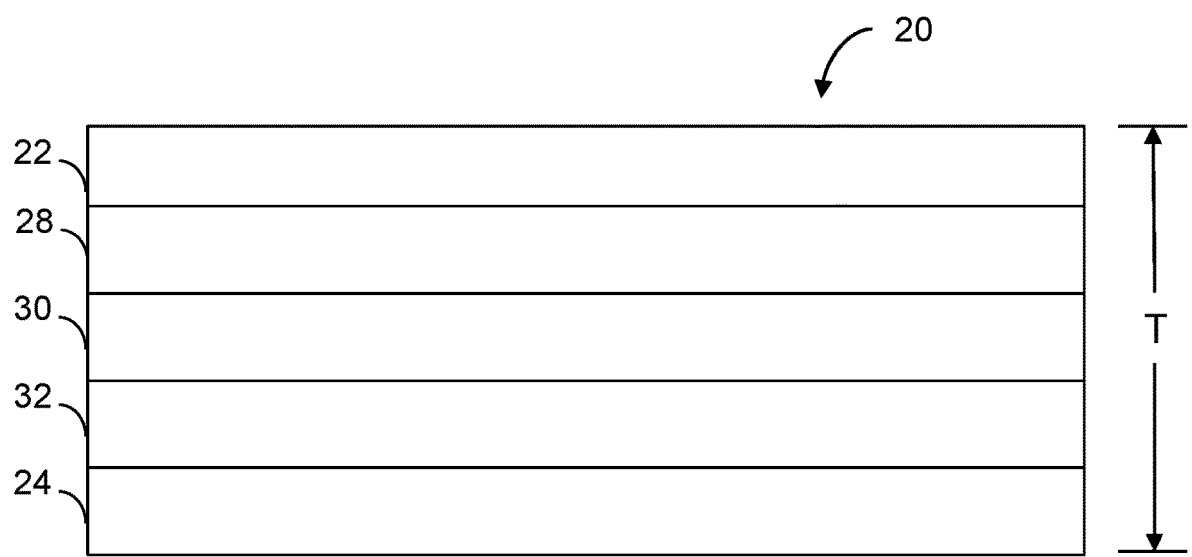
FIG. 2 is a schematic illustration of a multilayer material used for the storage container of FIG. 1.

Storage container 10, including top portion 12, bottom portion 14, and walls 16, is comprised of a multilayer material, which includes multiple layers of plastic. Reference is now made to FIG. 2, which is a schematic illustration of a multilayer material 20, in accordance with embodiments of the invention. Multilayer material 20 may include up to seven, eight, or even ten layers of co-extruded plastic materials. In embodiments of the invention, multilayer material 20 has five layers, as shown in FIG. 2. Although it should be readily apparent that more or fewer than five layers are possible, the embodiment shown in FIG. 2 includes five layers for exemplary purposes. As shown in FIG. 2, multilayer material includes an outer layer 22 and an inner layer 24, wherein outer layer 22 is exposed to air, and inner layer 24 is configured to be in contact with the dry commodity placed therein. Thus, outer layer 22 is the outside of storage container 10, as can be seen in FIG. 1. Inner layer 24 is inward facing and is not visible from the outside of storage container 10. For the purpose of the present description, in between outer layer 22 and inner layer 24 are intermediate layers including a first intermediate layer 28 adjacent to outer layer 22, a second intermediate layer 30 adjacent to first intermediate layer 28, a third intermediate layer 32 adjacent to second intermediate layer 30, and which may include additional intermediate layers and/or tie layers to bond some of the layers together when necessary. In some embodiments, only one intermediate layer may be used. Joining of the multiple layers together may be done, for example, by co-extrusion, lamination, or other methods. In addition to the described layers, outer layer 22 and/or one or more of the intermediate layers may be further treated by titanium dioxide to protect from UV radiation and to lower the overall temperature. For the purpose of description of the invention, this titanium dioxide treatment is not defined as a separate layer. Moreover, inner layer 24 and/or one or more of the intermediate layers may be covered with or incorporated with a black material. The black material may be, for example, a carbon black concentrate such as Carbon Black Coatings (The Cary Company, Addison, Ill.).

The black material provides photosynthetically active radiation (PAR) resistance. For the purpose of description of the invention, this black material is not defined as a separate layer.

In embodiments of the invention, at least one of layers 22, 24, 28, 30, 32 is polyethylene and at least another one of layers 22, 24, 28, 30, 32 is a plastic that is different than the first layer. In some embodiments, outer layer 22 is designed to provide strength and insect penetration resistance, while intermediate layers are designed to provide a suitable barrier for oxygen and water. In other embodiments, the layers may be reversed or otherwise positioned relative to one another. In the embodiment shown herein, outer layer 22 is comprised of polyethylene and at least one of the other layers is comprised of a material other than polyethylene, which may be, for example, a polyamide (PA) or ethylene vinyl-alcohol (EVOH) or a combination thereof. In this embodiment, at least one of inner layer 24, first intermediate layer 28, second intermediate layer 30, and third intermediate layer 32 is also comprised of polyethylene. In embodiments of the invention, at least 70% of the total volume of multilayer material is polyethylene. Since polyethylene provides for strength, wind resistance, and insect penetration resistance, this material is used for outer layer 22 or inner layer 24 in embodiments of the invention. It also may be used for one or more intermediate layers, to provide additional strength. The non-polyethylene layers are designed primarily for providing a suitable barrier for oxygen and water, and for reducing the overall thickness and weight of the container. In additional embodiments of the invention, at least 85% of the total multilayer material is polyethylene. Thus, for example, inner layer 24 may be comprised of a plastic other than polyethylene, while first intermediate layer 28, second intermediate layer 30, third intermediate layer 32, and outer layer 22 may include polyethylene. In some embodiments, different types of polyethylene may be used for different layers. Some examples include, but are not limited to, linear low-density polyethylene (LLDPE), linear medium density polyethylene (LMDPE), high density polyethylene (HDPE), and others, which can also incorporate other materials such as butene, octene and others.

A total thickness of the multilayer material is in a range of 0.1 to 0.5 mm. Walls 16 are comprised entirely of the multilayer material such that the total thickness of storage container 10 is in a range of 0.1-0.5 mm. In embodiments of the invention, a total thickness of the multilayer material is in a range of 0.2-0.3 mm. Each of the multiple layers may have different thicknesses. Thus, for example, one layer may be a "bulk layer" having a thickness which is double or more the thickness of the other layers. In addition to this "bulk layer", the other layers may be similar or different in thickness to one another. For example, outer layer 22 may be a bulk layer, having a thickness of 80 micrometers, while intermediate layers 28, 30, 32 may have thicknesses of 25-35 micrometers, and inner layer 24 may have a thickness of 40 micrometers. The bulk layer may be outer layer 22, for example. Alternatively, the bulk layer may be positioned adjacent to inner layer 24 (in the embodiment shown in FIG. 2, this would be third intermediate layer 32). The bulk layer may be any of the layers of the multilayer material and in some embodiments is comprised of PE. A bulk layer may be used to provide high strength and toughness and to reduce overall cost by using particular types of plastic which are high in strength and toughness but which by themselves do not necessarily provide some of the other features (i.e. insect penetration resistance, barrier to permeability). For example, a particular type of polyethylene may be suitable for this purpose (such as, for example, Butene LLDPE C4, Butene LLDPE C6, Butene LLDPE C8, metallocene, etc.) It is a particular feature of the invention that the thickness is significantly less than large outdoor storage systems, while still providing wind resistance. The tensile strength of the multilayer material of the invention is significantly higher than the tensile strength of other storage systems. The tensile strength of the multilayer material of the invention is greater than 25 MPa, and in some embodiments is in a range of 25-45 MPa. In some embodiments, the tensile strength of the multilayer material of the invention is in a range of 30-40 MPa. In some embodiments, the tensile strength of the multilayer material of the invention is approximately 38 MPa.

In embodiments of the invention, outer layer 22 is white to protect from UV rays. In some embodiments, an additional layer which is black in color may be added as an additional intermediate layer, or may be added internal to inner layer 24.

The weight of the multilayer material per $m^2$ is in a range of 100-300 $g/m^2$, and more particularly in a range of 150-250 $g/m^2$ and more particularly in a range of 175-225 $g/m^2$, and more particularly in a range of 190-210 $g/m^2$, and more particularly may be approximately 205 $g/m^2$.

The multilayer material of the invention is designed to prevent insect penetration by providing a high resistance to puncture. The use of polyethylene, and more particularly, metallocene or octene, provides puncture resistance due to its mechanical properties. This may be, for example, a PE layer such as outer layer 22 and/or a bulk layer. At least one layer provides elasticity and crack propagation resistance. The combination of these properties can be found in one or multiple layers in combination with each other. Moreover, the multilayer material of the invention is designed to prevent insect invasion by preventing mechanical damage through the use of flexible, high puncture resistant materials for at least one of the layers. More particularly, the insect penetration resistance of the multilayer material of the invention, as measured by the dart test as is known in the art, is at least 1000 $g/m^2$. In some embodiments, the insect penetration resistance of the multilayer material of the invention is 1000-1500 $g/m^2$ and more particularly is in a range of 1100-1300 $g/m^2$, and more particularly is in a range of 1150-1350 $g/m^2$. In some embodiments, the insect penetration resistance of the multilayer material of the invention is approximately 1200 $g/m^2$.

The multilayer material of the invention is designed to provide UV resistance and to prevent photo-thermal degradation via photosynthetically active radiation (PAR). UV resistance is provided by including titanium dioxide on top of outer layer 24, and by adding UV-Hindered Amine Light Stabilizers (HALS) additives to one or more layers to reduce the speed of degradation. In addition, use of a carbon black concentrate provides an opacity of higher than 98% to inhibit penetration of PAR.

Figure 3:
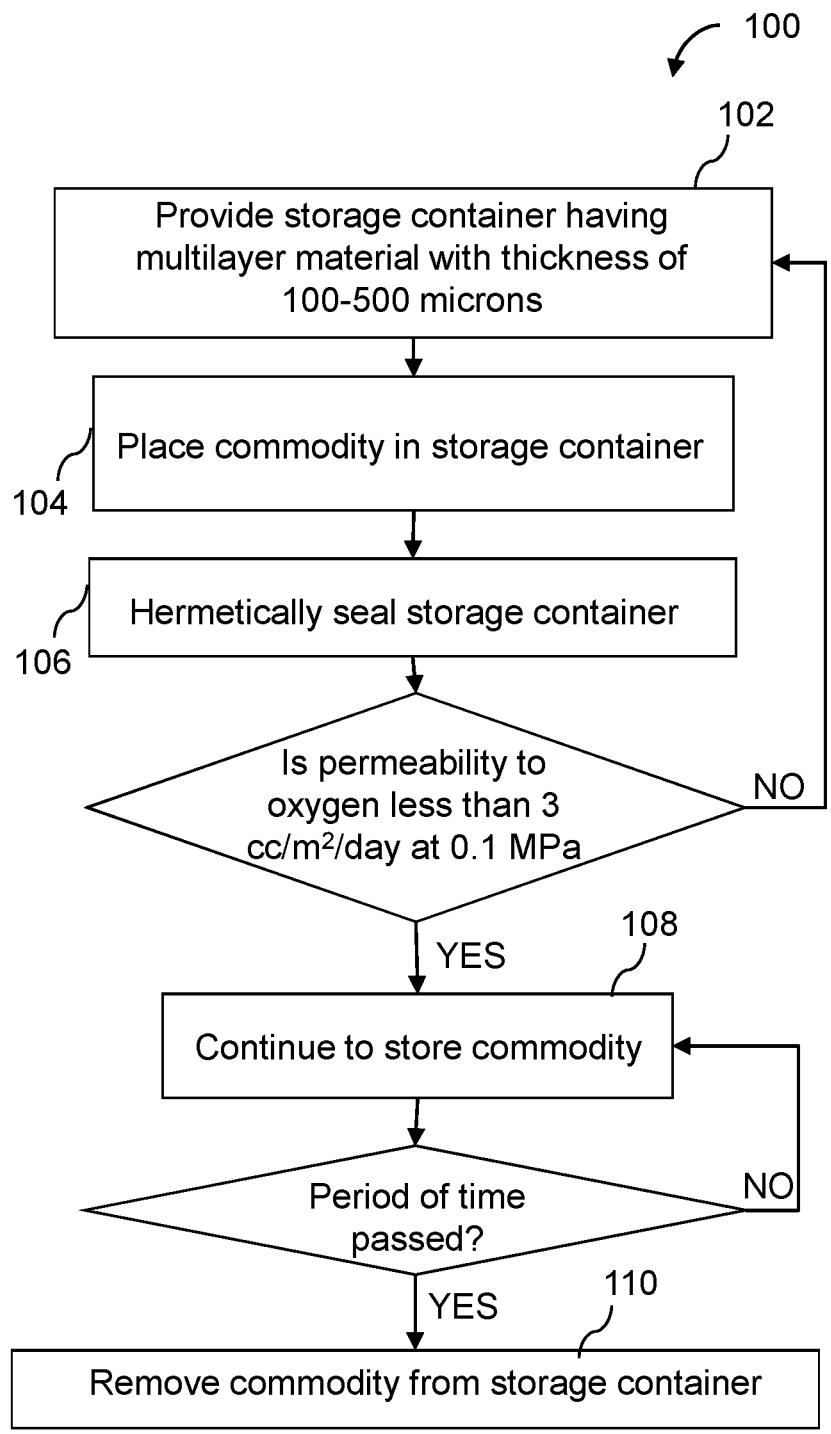
FIG. 3 is a flow-chart diagram of a method of storing a commodity, in accordance with embodiments of the invention.

The multilayer material of the invention is further configured to provide an oxygen transmission rate of less than 3 $cc/m^2/day$ at 0.1 MPa and in some embodiments less than 2 $cc/m^2/day$ and in some embodiments less than 1 $cc/m^2/day$. In some embodiments, the multilayer material of the invention is configured to provide an oxygen transmission rate of between 0.1 and 1 $cc/m^2/day$. Moreover, the multilayer material of the invention is further configured to provide a water vapor transmission rate of less than 8 $g/m^2/day$ and in some embodiments less than 4 $g/m^2/day$ and in some embodiments less than 2 $g/m^2/day$. In some embodiments, the multilayer material of the invention is configured to provide a water vapor transmission rate of between 0.5 and 2 $cc/m^2/day$. Reference is now made to FIG. 3, which is a flow chart diagram illustration of steps of a method 100 of hermetic storage of a dry agricultural commodity. First, a storage container having a wall comprised of a multilayer material, wherein the wall has a total thickness of 0.1-0.5 mm, is provided (step 102). The provided storage container includes a multilayer material which includes at least one layer of polyethylene and at least one layer of a different type of plastic. A dry agricultural commodity (up to 1000 tonne) is placed (step 104) into the storage container. The storage container is then sealed (step 106) using a hermetic seal such as a gas-tight zipper mechanism. The permeability to oxygen may then be checked to ensure hermeticity. If permeability to oxygen is less than 3 $cc/m^2/day$ at 0.1 MPa, then the dry commodity can continue to be stored (step 108) for a period of time, which may be, for example, greater than one year and up to five years. If the permeability to oxygen is not at the desired level, the storage container may be checked or fixed to ensure sufficient hermeticity. After the period of time for which hermeticity is desired has passed, the commodity is removed (step 110) from the storage container. The 5-year period of time for which hermeticity is guaranteed is relatively short compared to other large scale outdoor hermetic storage containers; however, there is a tradeoff of lower permeability to water and oxygen, along with lower weight, cost, and thickness as compared to other existing large scale outdoor hermetic storage containers. Moreover, the period of time of greater than one year is higher than the period of time provided by other lightweight storage containers. This feature provides for a substantial amount of storage time, without the need for high cost, bulky materials. If needed or desired, the commodity may be removed from the container at any time during the period by unzipping the gas tight zipper. The container may be collapsed and moved to a different location if desired.

EXAMPLES

Example 1

As an example of a multilayer material 20, in accordance with embodiments of the invention, the following five layers may be used:

Outer layer 22 polyethylene. This layer is an outer functional layer, designed to block moisture and provide a barrier to water. In embodiments of the invention, the thickness of outer layer 22 may be in a range of 10-50 micrometers, or in some embodiments 20-40 micrometers or in some embodiments 25-35 micrometers. Outer layer 22 in accordance with Example 1 may provide approximately 15% of the total thickness of the wall of the storage container. In embodiments of the invention, outer layer 22 is treated with titanium dioxide to minimize UV energy available for initiation of degradation reaction, and with HALS (Hindered Amine Light Stabilizers) additives to scavenge the free radicals formed before they can participate in a chain reaction of degradation. Alternatively, titanium dioxide is provided as an additional layer on top of outer layer 22.

First intermediate layer 28: PE—this layer is a tie layer, sandwiched between two functional layers. In the present example, this tie layer is sandwiched between the barrier layer used as outer layer 22 and a middle layer which provides puncture resistance. First intermediate layer 28 may be comprised of a PE, for example, LLDPE, and has a thickness in a range of 10-40 micrometers or in some embodiments 15-35 micrometers, or in some embodiments 20-30 micrometers.

Second intermediate layer 30: Octene mLMDPE—this is a functional layer designed to provide puncture resistance as well as strength and toughness. It may be treated with carbon black and in some embodiments with HALS additives. The thickness of second intermediate layer is greater than the first intermediate layer, since it is a functional layer, and may be in a range of 20-50 micrometers or in some embodiments 25-45 micrometers or in some embodiments 35-40 micrometers. In the present example, second intermediate layer 30 comprises approximately 15-20% of the total thickness of the wall of the storage container.

Third intermediate layer 30: This is a bulk layer in accordance with embodiments of the invention. It is lower cost and tough. Carbon black and/or HALS additives may be added as a separate layer. It comprises approximately 35% of the total thickness of multilayer material 20. This layer provides puncture, abrasion, toughness and UV blocker. In one embodiment, this layer is a bulk layer and is at least twice as thick as any of the other layers. In embodiments of the invention in accordance with Example 1, outer layer 24 may be in a range of 70-100 micrometers in thickness or in some embodiments in a range of 75-95 micrometers in thickness or in some embodiments in a range of 80-90 micrometers in thickness. In some embodiments, a low cost/unit type of polyethylene, such as Butene, is used in order to provide a tough, strong material while keeping the cost down.

Inner layer 22: Octene mLLDPE. It provides puncture resistance, seal strength and toughness. The thickness of inner layer 22 is approximately the same as second intermediate layer 30, in accordance with the present example.

It should be readily apparent that the order of the layers of the present example provides a particular advantage in that only a single tie layer is needed to coextrude the materials together. In alternative embodiments, the second and third intermediate layers may be reversed so that the highest thickness is located in the center of the multilayer material.

Example 2

As an example of a multilayer material 20, in accordance with embodiments of the invention, the following five layers may be used:

Outer layer 22 PE—This layer provides puncture, abrasion, toughness and UV blocker. In one embodiment, this layer is a bulk layer and is at least twice as thick as any of the other layers. In embodiments of the invention in accordance with Example 1, outer layer 24 may be in a range of 70-100 micrometers in thickness or in some embodiments in a range of 75-95 micrometers in thickness or in some embodiments in a range of 80-90 micrometers in thickness. In some embodiments, a low cost/unit type of polyethylene, such as Butene, is used in order to provide a tough, strong material while keeping the cost down. In embodiments of the invention, outer layer 22 is treated with titanium dioxide to minimize UV energy available for initiation of degradation reaction, and with HALS (Hindered Amine Light Stabilizers) additives to scavenge the free radicals formed before they can participate in a chain reaction of degradation. Alternatively, titanium dioxide is provided as an additional layer on top of outer layer 22.

First intermediate layer 28: PE—this layer is a tie layer, sandwiched between the high strength polyethylene of outer layer 22 and a barrier layer for hermeticity, which may be, for example, nylon or EVOH. First intermediate layer 28 may be comprised of, for example, LLDPE, and has a thickness in a range of 10-40 micrometers or in some embodiments 15-35 micrometers, or in some embodiments 20-30 micrometers.

Second intermediate layer 30: Nylon or EVOH or a combination thereof. This layer is a functional layer, designed to provide a barrier to oxygen. In embodiments of the invention, the thickness of second intermediate layer 30 may be in a range of 10-50 micrometers, or in some embodiments 20-40 micrometers or in some embodiments 25-35 micrometers. Second intermediate layer 30 in accordance with Example 1 may provide approximately 15% of the total thickness of the wall of the storage container.

Third intermediate layer 32 is similar or identical to first intermediate layer 28. This layer is a tie layer, sandwiched between the high strength polyethylene of outer layer 22 and a barrier layer for hermeticity, which may be, for example, nylon or EVOH. First intermediate layer 28 may be comprised of, for example, LLDPE, and has a thickness in a range of 10-40 micrometers or in some embodiments 15-35 micrometers, or in some embodiments 20-30 micrometers.

Inner layer 24: PE. This layer is designed to provide puncture resistance as well as strength and toughness. It may be treated with carbon black. The thickness of second intermediate layer is greater than the first intermediate layer, since it is a functional layer, and may be in a range of 20-50 micrometers or in some embodiments 25-45 micrometers or in some embodiments 35-40 micrometers. In the present example, second intermediate layer 30 comprises approximately 15-20% of the total thickness of the wall of the storage container.

Other examples are possible, including combinations and additions of different plastics and tie materials to form six or seven layers, for example.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the invention.

What is claimed is:

1. A system for hermetic storage of a dry commodity, the system comprising:
    (1) a flexible, hermetic storage container for containment and hermetic sealing of the dry commodity therein, wherein the dry commodity has a weight of between 5 tonnes and 1000 tonnes, the flexible, hermetic storage container comprising a wall having a thickness of 0.1-0.5 mm, a tensile strength of 25-45 MPa, and an impact resistance of 1000-1200 $g/m^2$ as measured by a dart test, the wall comprised of:
        (a) an outer layer comprised of a first plastic material; and
        (b) an inner layer comprised of a second plastic material; and
        (c) an intermediate layer comprised of a third plastic material said intermediate layer providing permeability to oxygen of less than 3 $cc/m^2/day$, said intermediate layer sandwiched between the outer layer and the inner layer, wherein said first plastic material, said second plastic material and said third plastic material comprise at least two different types of plastic material, said outer layer, said inner layer and said intermediate layer joined together forming a multilayer material; and
    (2) a hermetic sealing mechanism for sealing said flexible, hermetic storage container.

2. The system of claim 1, wherein at least one of the outer layer, the inner layer and the intermediate layer is a polyethylene material.

3. The system of claim 1, wherein at least one of the outer layer, the inner layer, and the intermediate layer is a polyamide material.

4. The system of claim 1, wherein at least one of the outer layer, the inner layer, and the intermediate layer is a EVOH.

5. The system of claim 1, further comprising at least one additional intermediate layer, wherein said inner layer, said outer layer, said intermediate layer and at least one additional intermediate layer are joined to form the multilayer material.

6. The system of claim 5, wherein the at least one additional intermediate layer comprises two additional intermediate layers for a total of five layers, wherein the five layers are joined to form the multilayer material.

7. The system of claim 1, further comprising a layer which is black in color to increase opacity to photosynthetically active radiation (PAR) light.

8. The system of claim 2, wherein said polyethylene is comprised of multiple types of polyethylene, wherein each of the multiple types of polyethylene comprises one of the layers of the multilayer material, and wherein each of the types of polyethylene is selected from at least one of: linear low-density polyethylene (LLDPE), linear medium density polyethylene (LMDPE), high density polyethylene (HDPE), and polyethylene in the form of butene or octene.

9. The system of claim 1, wherein the flexible, hermetic storage container is configured to block UV radiation and is configured to resist degradation, weakening, wear, or combinations thereof due to exposure to outdoor conditions.

10. The system of claim 1, wherein the multilayer material weighs in the range of 100-300 $g/m^2$.

11. The system of claim 1, wherein the outer layer, the inner layer, and the intermediate layer are co-extruded or laminated to form the multilayer material.

12. The system of claim 1, wherein one of the outer layer, the inner layer, and the intermediate layer comprises a bulk layer, the bulk layer having a thickness that is 2 or more times thicker than the thickness of the other of the outer layer, the inner layer, and the intermediate layer.

13. The system of claim 12, wherein the bulk layer is the outer layer.

14. The system of claim 12, wherein the bulk layer is formed of polyethylene.

15. The system of claim 1, wherein the wall has a thickness of less than 0.25 mm.

16. A method for storage of a dry commodity having a weight of 1-1000 tonnes, the method comprising:
    providing a flexible, hermetic storage container for containment and hermetic sealing of the dry agricultural commodity therein, to provide a multi-layer material having a first outer layer comprised of a first plastic material and a middle layer comprised of a second plastic material which includes a barrier material and is different than said first plastic material and an inner layer comprised of a third plastic material, wherein the outer, middle and inner layers are joined to comprise the multilayer material, wherein the multilayer material has a thickness of 0.1-0.5 mm, a tensile strength of 25-45 MPa, and impact resistance of 1000-1500 $g/m^2$ as measured by a dart test, and wherein the storage container has a size to hold the commodity having a weight of 5-1000 tonnes;
    placing the dry agricultural commodity, having a weight of 1-1000 tonnes, in the flexible, hermetic storage container; and
    hermetically sealing the flexible, hermetic storage container.

17. The method of claim 16, wherein the multilayer material is resistant to UV and PAR.

18. The method of claim 16, wherein the hermetically sealing is done by zipping a hermetic zipper.

19. The method of claim 16, wherein said providing a flexible, hermetic storage container comprises providing at least one layer of a polyamide material.

20. The method of claim 16, wherein said providing a flexible, hermetic storage container comprises providing at least one layer of EVOH.

21. The method of claim 16, wherein said providing a flexible, hermetic storage container comprises providing one or multiple types of polyethylene such that 70-90% of the multilayer material is comprised of polyethylene, and wherein each of the multiple types of polyethylene is selected from at least one of: linear low-density polyethylene (LLDPE), linear medium density polyethylene (LMDPE), high density polyethylene (HDPE), and polyethylene in the form of butene or octene.

22. The method of claim 16, wherein the multilayer material has a permeability of less than 3 $cc/m^2/day$ for oxygen.

23. The method of claim 16, wherein the multilayer material comprises a bulk layer, the bulk layer having a thickness two or more times the thickness of the remaining layers of the multilayer material.

24. The method of claim 16, wherein the multilayer material weighs between 100-300 $g/m^2$.

25. The method of claim 16, wherein the flexible, hermetic storage container blocks UV radiation and resists degradation, weakening, wear, or combinations thereof due to exposure to outdoor conditions.

* * * * *